(12) United States Patent
Curtis et al.

(10) Patent No.: US 9,197,055 B2
(45) Date of Patent: Nov. 24, 2015

(54) GROUND MONITOR CURRENT SENSING

(71) Applicant: Intermountain Electronics, Inc., Price, UT (US)

(72) Inventors: Dale Curtis, Castle Dale, UT (US); Robin Vice, Phoenix, AZ (US)

(73) Assignee: Intermountain Electronices, Inc., Price, UT (US)

( * ) Notice: Subject to any disclaimer, the term of this patent is extended or adjusted under 35 U.S.C. 154(b) by 246 days.

(21) Appl. No.: 13/906,807

(22) Filed: May 31, 2013

(65) Prior Publication Data

US 2014/0177117 A1  Jun. 26, 2014

Related U.S. Application Data

(60) Provisional application No. 61/740,346, filed on Dec. 20, 2012.

(51) Int. Cl.
| | | |
|---|---|---|
| *H02H 3/08* | (2006.01) | |
| *H02H 3/12* | (2006.01) | |
| *H02H 9/08* | (2006.01) | |
| *H02H 3/16* | (2006.01) | |

(52) U.S. Cl.
CPC . *H02H 3/08* (2013.01); *H02H 3/12* (2013.01); *H02H 3/162* (2013.01); *H02H 3/165* (2013.01); *H02H 9/08* (2013.01)

(58) Field of Classification Search
CPC ........... H02H 3/08; H02H 3/12; H02H 3/165; H02H 9/08
USPC .......................................................... 361/42
See application file for complete search history.

(56) References Cited

U.S. PATENT DOCUMENTS

| | | | | |
|---|---|---|---|---|
| 3,335,324 | A | * | 8/1967 | Buckeridge ..................... 361/48 |
| 3,995,200 | A | | 11/1976 | Stolarczyk |
| 4,228,475 | A | * | 10/1980 | Sherwood ....................... 361/47 |
| 4,295,175 | A | | 10/1981 | Cordray |
| 4,415,850 | A | | 11/1983 | Sherwood |
| 4,609,865 | A | | 9/1986 | Goodman et al. |
| 4,638,244 | A | | 1/1987 | Howell |
| 5,576,920 | A | | 11/1996 | Kosuga et al. |
| 5,644,461 | A | | 7/1997 | Miller et al. |

(Continued)

OTHER PUBLICATIONS

Line Power, Groundkeeper 145 Continuity Type Ground Monitor, http://linepower.com/literature/pdf/LPMS-GK145, 1993.

(Continued)

*Primary Examiner* — Thienvu Tran
*Assistant Examiner* — Kevin J Comber
(74) *Attorney, Agent, or Firm* — Kunzler Law Group

(57) ABSTRACT

A ground monitor apparatus for monitoring ground current includes a DC detection module, a DC threshold module, and a trip module. The current monitor module monitors current in a pilot conductor or a ground return. The pilot conductor injects current in a grounding conductor of a power cable assembly connecting a power source to a load. A voltage source is connected to the pilot conductor and the ground return. The DC detection module determines a direct current ("DC") current present in the current monitored by the current monitor module and the DC threshold module determines if the DC current is above a DC current threshold. The trip module opens a contact in response to the DC threshold module determining that the DC current is above the DC current threshold. The contact disconnects the power source from the power cable assembly.

22 Claims, 8 Drawing Sheets

(56) References Cited

U.S. PATENT DOCUMENTS 8,149,552 B1 4/2012 Cordill
2007/0159750 A1 7/2007 Peker et al.

OTHER PUBLICATIONS

Service Machine, SMC C54-004 and C54-005 Series Ground Monitors, Publication Date: Feb. 2, 1993.

U.S. Appl. No. 13/907,019 Office Action, mailed Jan. 2, 2015.
U.S. Appl. No. 13/907,057 Office Action, mailed Feb. 6, 2015.
U.S. Appl. No. 13/907,019 Notice of Allowance, mailed Jun. 22, 2015.
U.S. Appl. No. 13/907,057 Notice of Allowance, mailed Jun. 5, 2015.

* cited by examiner

GROUND MONITOR CURRENT SENSING

CROSS-REFERENCES TO RELATED APPLICATIONS

This application claims the benefit of U.S. Provisional Patent Application No. 61/740,346 entitled "Ground Monitor Current Sensing" and filed on Dec. 20, 2012 for Dale Curtis, et al., which is incorporated herein by reference. U.S. application Ser. No. 13/907,019 entitled "Ground Monitor Circuit Protection Apparatus," Filed May 31, 2013 for Dale Curtis, et al., and U.S. application Ser. No. 13/907,057 entitled "Ground Monitor Accessory Connection," Filed May 31, 2013 for Dale Curtis, et al. are herein incorporated by reference for all purposes.

FIELD

This invention relates to monitoring of ground current and more particularly relates to monitoring of ground current in power sources for mining.

BACKGROUND

Mining is a very special environment that is by its very nature hazardous. Mine shafts are very limited physically, often include wet conditions, and can have explosive gases and dust. The mining industry has a long history of accidents and fatalities. As a result, governmental regulations as well as company policies are geared toward making mining safer for those that enter and work in mines. One governmental agency that regulates mining practice in the United States is the Mine Safety and Health Administration ("MSHA"). MSHA provides regulations as well as enforcement of the regulations.

Mining equipment is typically large and requires a significant amount of power. Mining equipment is also typically portable. To provide power to the mining equipment, portable power sources are provided in and around mines. Due to the high power requirements of mining equipment as well as mines having long shafts, often mining power source have voltages that are higher than are typically found in industrial situations. It is not uncommon for the mining power sources to provide power with voltages being about 1 kilo volt ("KV"). In addition, due to the portability of the mining equipment and power sources, often power is provided using flexible cables run without conduit. Due to the high voltages, exposed cables, wet conditions, etc., special consideration must be made for safety of the electrical power systems in mining.

One way to increase safety and reliability of mining power systems is to determine if grounding conductors are in place and properly connected. When grounding conductors are not properly connected, have short circuits, etc., when a fault condition occurs, electrical current can flow through the earth surrounding mine shafts as well as through mining equipment. Current flowing in unintended routes create a shock hazard for miners both for fault conditions before overcurrent protection reacts as well as steady state conditions when continuous current flow in unintended paths.

MSHA has provided regulations for monitoring current in grounding conductors. MSHA regulations regarding ground current were changed several years ago. Much of the electrical power system equipment in use today in mines today does not meet current MSHA requirements found in testing standard 30 of the Code of Federal Regulations ("C.F.R.") section 75 and 30 C.F.R. section 77 with respect to ground current monitoring.

SUMMARY

A ground monitor apparatus for monitoring ground current is disclosed. A system and method also perform the functions of the apparatus. The ground monitor apparatus includes a DC detection module, a DC threshold module, and a trip module. The current monitor module monitors current in a pilot conductor or a ground return. The pilot conductor injects current in a grounding conductor of a power cable assembly connecting a power source to a load. A voltage source is connected to the pilot conductor and the ground return. The DC detection module determines a direct current ("DC") current present in the current monitored by the current monitor module and the DC threshold module determines if the DC current is above a DC current threshold. The trip module opens a contact in response to the DC threshold module determining that the DC current is above the DC current threshold. The contact disconnects the power source from the power cable assembly.

In one embodiment, the apparatus includes a current anomaly module that determines a current of the current monitored by the current monitor module and an anomaly threshold module that determines if the current determined by the current anomaly module is below a current anomaly threshold. The trip module further opens the contact in response to the anomaly threshold module determining that the current determined by the current anomaly module is below the anomaly current threshold. In a further embodiment, the anomaly current threshold corresponds to a grounding conductor resistance of less than 50 ohms. In another embodiment, the current anomaly module determines a current of the current monitor module by determining a DC current of the current monitored by the current monitor module, determining an average current of the current monitored by the current monitor module, and/or determining a peak current of the current monitored by the current monitor module. In another embodiment, the current monitor module includes a Hall-effect current sensor. In another embodiment, the DC current threshold corresponds to a current that is above a DC current in the pilot conductor or ground return that is at a level indicative of an operating condition without a stray DC current component.

In one embodiment, the apparatus includes a return current sensor that monitors current in the grounding conductor, a return current module that determines a current of the current in the grounding conductor, and a return current threshold module that determines if the current in the grounding conductor is below a return current threshold. The trip module also opens the contact in response to the return current threshold module determining that the current in the grounding conductor is below the return current threshold. In another embodiment, the voltage source includes an alternating current ("AC") voltage source and the apparatus includes a diode located at the load and connected between a pilot conductor from the current monitor module and the grounding conductor. The diode rectifies the voltage of the AC voltage source.

In one embodiment, the apparatus is part of a ground monitor in a power supply for a mine. In another embodiment, the apparatus complies with mine safety and health administration ("MSHA") testing standard 30 the Code of Federal Regulations ("C.F.R.") section 75, 30 C.F.R. section 77, American Society for Testing and Materials ("ASTP") standard 2135, and MSHA document number ACRI 2003.

Another ground monitor apparatus includes a current monitor module, a current anomaly module, an anomaly threshold module, and a trip module. The current monitor module monitors current with a Hall-effect sensor. The current monitor module monitors current in a pilot conductor or a ground return. The pilot conductor injects current in a grounding conductor of a power cable assembly connecting a power source to a load. A voltage source is connected to the pilot conductor and the ground return. The current anomaly module determines a current of the current monitored by the current monitor module and the anomaly threshold module determines if the current determined by the current anomaly module is below a current anomaly threshold. The trip module that opens a contact in response to the anomaly threshold module determining that the current determined by the current anomaly module is below the current anomaly threshold. The contact disconnects the power source from the power cable assembly.

In one embodiment, the current anomaly threshold corresponds to a grounding conductor resistance of less than 50 ohms. In another embodiment, the apparatus includes a DC detection module that determines a direct current ("DC") current present in the current monitored by the current monitor module and a DC threshold module that determines if the DC current is above a DC current threshold. The trip module further opens the contact in response to the DC threshold module determining that the DC current is above the DC current threshold. In a further embodiment, the DC current threshold corresponds to a current that is above a DC current in the pilot conductor or ground return that is at a level indicative of an operating condition without a stray DC current component.

In one embodiment, the apparatus includes a return current sensor that monitors current in the grounding conductor, a return current module that determines a current of the current in the grounding conductor, and a return current threshold module that determines if the current in the grounding conductor is below a return current threshold. The trip module further opens the contact in response to the return current threshold module determining that the current in the grounding conductor is below the return current threshold.

In one embodiment, the voltage source includes an alternating current ("AC") voltage source and the apparatus includes a diode located at the load and connected between a pilot conductor from the current monitor module and the grounding conductor. The diode rectifies the voltage of the AC voltage source. In another embodiment, the apparatus complies with mine safety and health administration ("MSHA") testing standard 30 the Code of Federal Regulations ("C.F.R.") section 75, 30 C.F.R. section 77, American Society for Testing and Materials ("ASTP") standard 2135, and MSHA document number ACRI 2003.

A system for monitoring ground current includes a power source, a current monitor module, a DC detection module, a DC threshold module, and a trip module. The current monitor module monitors current in a pilot conductor or a ground return. The pilot conductor injects current in a grounding conductor of a power cable assembly connecting the power source to a load and a voltage source is connected to the pilot conductor and the ground return. The DC detection module determines a direct current ("DC") current present in the current monitored by the current monitor module. The DC threshold module determines if the DC current is above a DC current threshold and the trip module opens a contact in response to the DC threshold module determining that the DC current is above the DC current threshold. The contact disconnects the power source from the power cable assembly. In one embodiment, the system includes the power cable assembly. In another embodiment, the system includes the load.

A method for monitoring ground current includes monitoring current in one of a pilot conductor and a ground return. The pilot conductor injects current in a grounding conductor of a power cable assembly connecting a power source to a load. A voltage source is connected to the pilot conductor and the ground return. The method includes determining a direct current ("DC") current present in the monitored current, determining if the DC current is above a DC current threshold, and opening a contact in response to determining that the DC current is above the DC current threshold. The contact disconnects the power source from the power cable assembly.

Another method for monitoring ground current includes monitoring current in a pilot conductor or a ground return using a Hall-effect sensor. The pilot conductor injects current in a grounding conductor of a power cable assembly connecting a power source to a load. A voltage source is connected to the pilot conductor and the ground return. The method includes determining a current of the monitored current, determining if the current is below a current anomaly threshold, and opening a contact in response to determining that the current is below the current anomaly threshold. The contact disconnects the power source from the power cable assembly.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
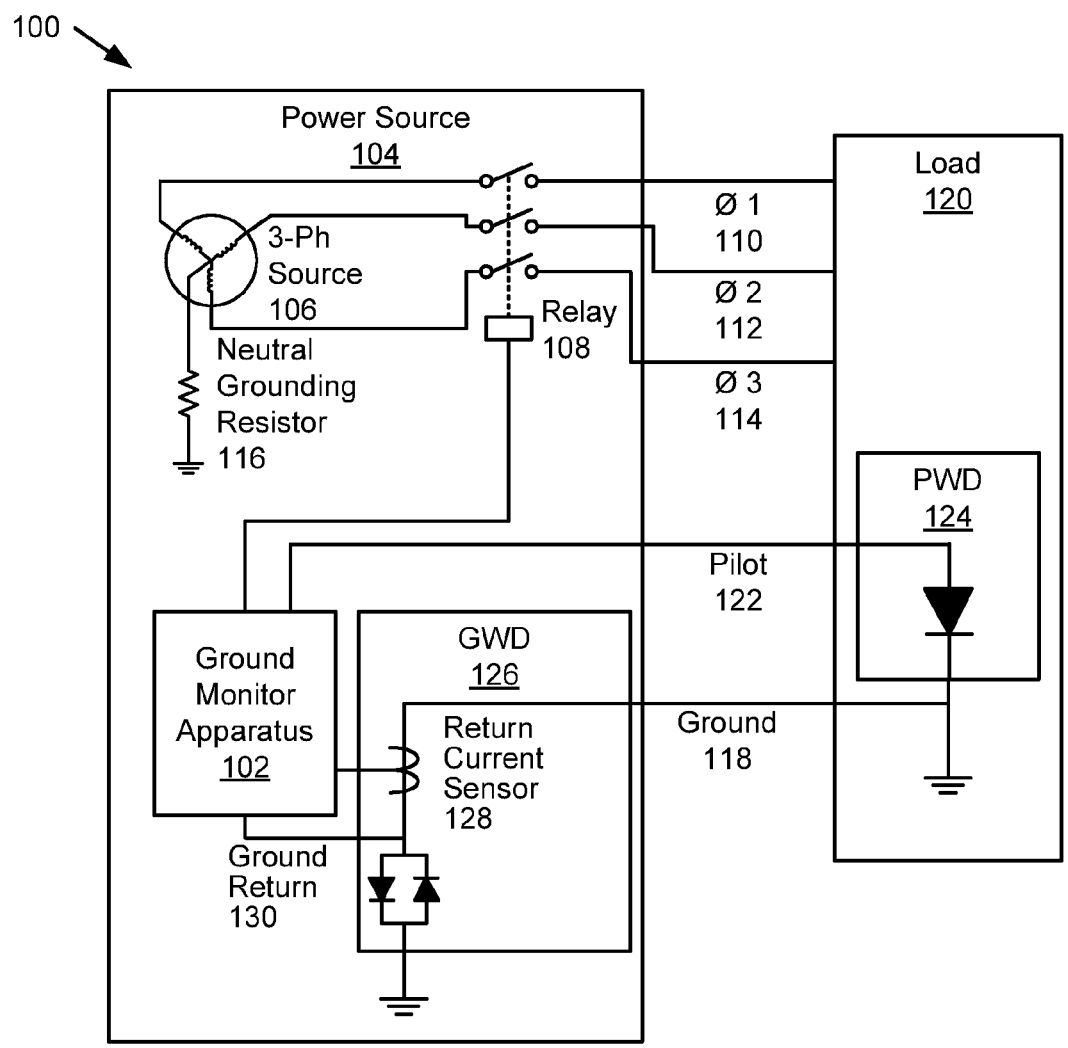
FIG. 1 is a schematic block diagram illustrating one embodiment of a ground monitor system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 is a schematic block diagram illustrating one embodiment of a ground monitor system 100. The system 100 includes a ground monitor apparatus 102 in a power source 104. The power source 104 includes a three-phase power source 106, a relay 108, and a ground wire device ("GWD") 126 with a return current sensor 128. The power source 104 is wired to a load 120 with a power cable assembly that includes a first phase 110, a second phase 112, a third phase 114, and a grounding conductor 118, a neutral grounding resistor 116, a pilot conductor 122, and ground return 130. The load 120 includes a pilot wire diode ("PWD") 124. In another embodiment, the system 100 does not include a PWD 124. The elements of the system 100 are described below.

Figure 2:
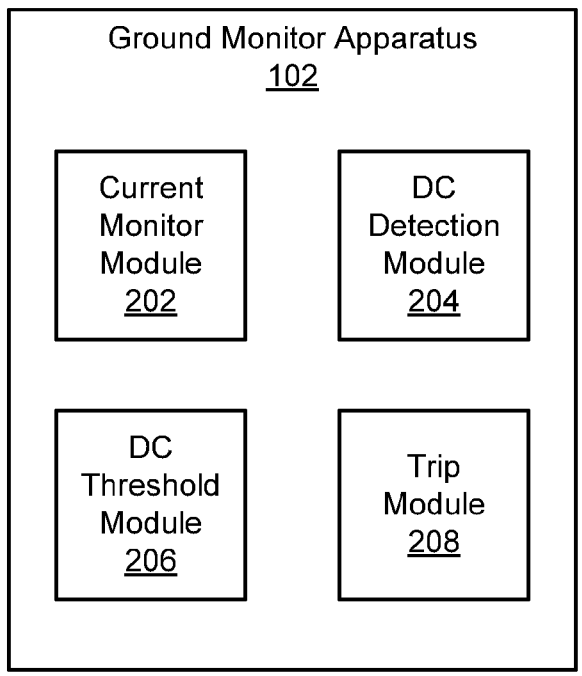
FIG. 2 is a schematic block diagram illustrating an apparatus that includes an embodiment of the ground monitor apparatus.
Figure 3A:
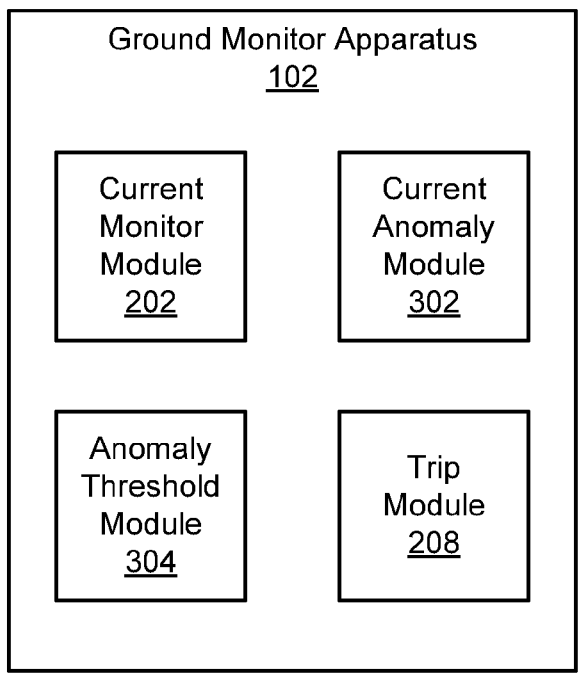
FIG. 3A is a schematic block diagram illustrating an apparatus that includes an alternate embodiment of the ground monitor apparatus.
Figure 3B:
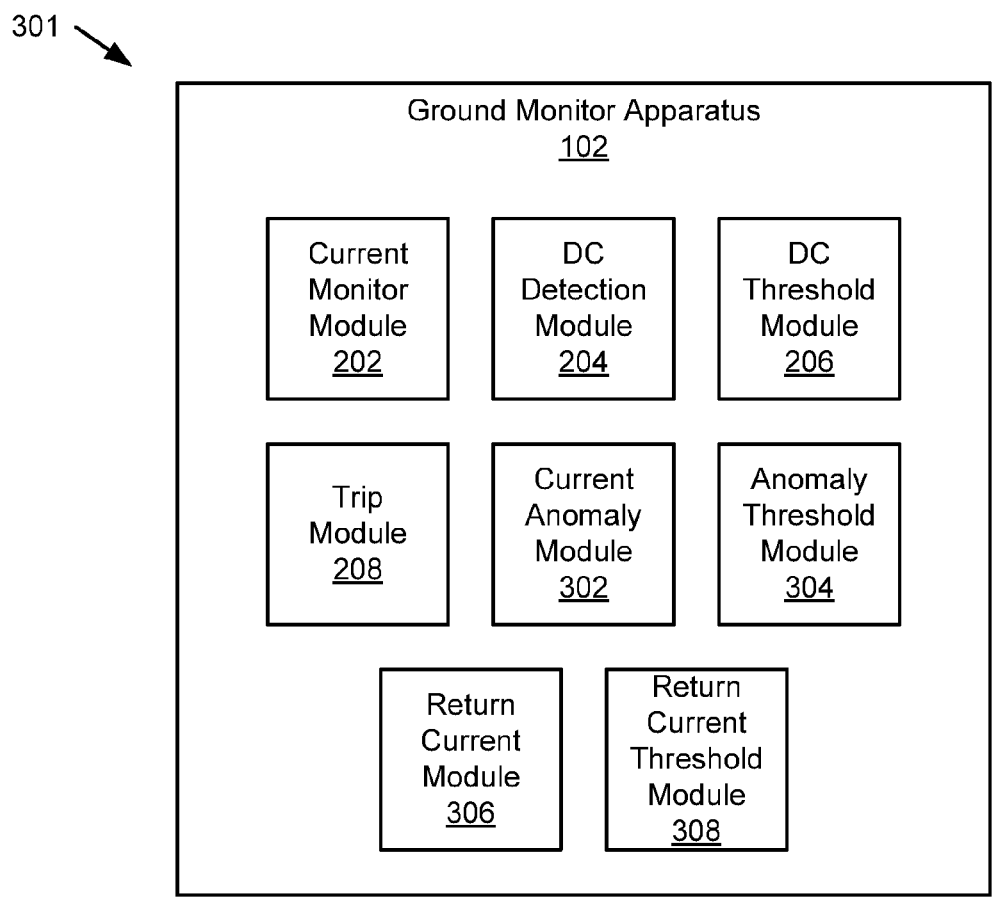
FIG. 3B is a schematic block diagram illustrating an apparatus that includes another embodiment of the ground monitor apparatus.

The ground monitor apparatus 102 monitors current in the grounding conductor 118, and is described in more detail with regard to the apparatus 200 of FIG. 2, the apparatus 300 of FIG. 3A, and the apparatus 301 of FIG. 3B. The power source 104, in one embodiment, includes a three-phase power source 106. In one example, the three-phase power source 106 is a wye-connected source. The three-phase power source 106, in one example, is grounded through a neutral grounding resistor 116. In another embodiment, the three-phase power source 106 may be a delta-connected power source. In another embodiment, the power source 104 includes another type of power source, such as a single-phase power source or a direct current ("DC") power source. The three-phase power source 106 may include some type of a generator, or maybe wired to another source (not shown). In another embodiment, the power source 104 may include multiple power sources. In a particular embodiment, the power source 104 may be configured for an application in a mine. The power source 104, in one embodiment, is configured for mining applications and in another embodiment is configured to meet requirements of the Mine Safety and Health Administration ("MSHA"). One of skill in the art will recognize other power sources 104 that may include a ground monitor apparatus 102.

In one embodiment, the power source 104 includes a relay 108. In one example, the relay 108 is a three-phase contactor. In another example, the relay 108 is a circuit breaker with the remote trip. The relay 108 includes a capability to be commanded open by the ground monitor apparatus 102. The relay 108 may include a fault detection module (not shown) that sends a trip signal to the relay 108 on detection of an overcurrent condition. For example, the fault detection module may include current sensing and/or voltage sensing circuits may indicate an overcurrent or fault condition. The fault detection module may have an inverse time characteristic or other common protective relaying characteristic and may coordinate with other overcurrent protection devices upstream and downstream. The relay 108 may also be opened for other conditions, such as a manual command to open.

In one example, the relay 108 also includes the capability to be commanded open by the ground monitor apparatus 102. For example, the ground monitor apparatus 102 may send a command to open the relay 108 upon detection of a ground problem. In another embodiment, or the power source 104 includes a different type of power source, such as a single phase source, the relay 108 may include a different number of poles. In another example, the relay 108 may be a three-pole contactor. One of skill in the art will recognize other types of relays 108 that may be used in conjunction with the power source 104 that includes a ground monitor apparatus 102.

In one embodiment, the system 100 includes a power cable assembly wired to the load 120 with a first phase 110, a second phase 112, a third phase 114, and a grounding conductor 118. In other embodiments, the power cable assembly may include a neutral conductor (grounded conductor) wired to the load and/or the pilot conductor 122. For safety, it is desirable to determine if the grounding conductor 118 is properly connected between the power source 104 and the load 120. For example, if the grounding conductor 118 is disconnected, has failed, or in some way is not properly connected between the power source 104 and the load 120, there may be a hidden danger within the system 100. For instance, if a short circuit occurs and the grounding conductor 118 is not properly connected, current may flow through the ground from the load 120 to the power source 104 and may generate an electric field within the ground that may cause an electrical hazard for personnel. In one embodiment, the ground monitor apparatus 102 helps to ensure that the grounding conductor 118 is properly connected and functioning.

In one embodiment, the ground monitor apparatus 102 injects a signal into the grounding conductor 118 to sense an undesirable condition, such as a high impedance within the grounding conductor 118, a short between the pilot conductor 122 and ground, or other failure in the grounding conductor 118 or in the ground monitor apparatus 102 and associated components.

In one embodiment, the pilot conductor 122 connects the ground monitor apparatus 102 to the PWD 124 located in the load 120. The PWD 124, in one embodiment, includes a diode, and the pilot conductor 122 is wired to the anode or cathode of the diode. The opposite terminal (the anode or cathode) of the diode may be wired to the chassis ground of the load 120. The grounding conductor 118 is also connected to the chassis ground of the load 120. In one embodiment, the ground monitor apparatus 102 connects an alternating current ("AC") source to the pilot conductor 122. The diode in the PWD 124 rectifies the AC voltage signal so that a rectified current signal flows through the pilot conductor 122 and returns on the grounding conductor 118. If the diode in the PWD 124 fails short or if the pilot conductor 122 is shorted to ground, the current signal changes and the ground monitor apparatus 102 is able to detect the change and open the relay 108.

In an alternate embodiment, the load 120 does not include a PWD 124 with a diode and the pilot conductor 122 connects to chassis ground of the load 120 and to the grounding conductor 118. In the embodiment, the ground monitor apparatus 102 may use a different current sensing scheme than where the PWD 124 with a diode is included. In another embodiment, a DC voltage source injects current into the pilot conductor 122 and the load does not include a PWD 124 with a diode. In another embodiment, a DC voltage source injects current into the pilot conductor 122 and the load includes a PWD 124 with a diode. In the embodiment, the diode in the PWD 124 may be a zener diode with the pilot conductor 122 connected to the cathode the grounding conductor 118 connected to the anode of the zener diode. Various embodiments will be described below with respect to the apparatuses 200, 300, 301 of FIGS. 2, 3A and 3B.

In one embodiment, the power source 104 includes a GWD 126. The GWD 126, in one embodiment, includes a return current sensor 128. In one example, the return current sensor 128 includes a current transformer that senses current in the grounding conductor 118. In another example, the grounding conductor 118 is connected to back to back diodes within the GWD 126, and the back-to-back diodes are also connected to the chassis ground of the power source 104. The back-to-back diodes, in some embodiments, provide some signal isolation for monitoring injected signal in the grounding conductor 118 from the pilot conductor 122. In addition, the back-to-back diodes in the GWD 126 help to keep any voltage on the grounding conductor 118 to within a diode drop of the chassis ground. In another embodiment, a saturable coil may replace the back-to-back diodes. The saturable coil, in one embodiment, may help keep voltage on the grounding conductor 118 within a saturation voltage of the chassis ground. In another embodiment, the GWD 126 does not include back-to-back diodes but includes a return current sensor 128 and the grounding conductor 118 is connected to chassis ground of the power source 104. In another embodiment, the GWD 126 does not include back-to-back diodes or a return current sensor 128 and the grounding conductor 118 is connected to chassis ground of the power source 104. One skilled in the art will recognize that various other methods exist that can help limit the voltage potential between the grounding conductor 118 and the chassis ground, while providing some signal isolation for monitoring injected signal in the grounding conductor 118.

FIG. 2 is a schematic block diagram illustrating an apparatus 200 that includes an embodiment of the ground monitor apparatus 102. The apparatus 200 includes a current monitor module 202, a DC detection module 204, a DC threshold module 206, and a trip module 208, which are described below.

The apparatus 200 includes, in one embodiment, a ground monitor apparatus 102 with a current monitor module 202 that monitors current in the pilot conductor 122. In another embodiment, the current monitor module 202 monitors current in the ground return 130. The pilot conductor 122 injects current in the grounding conductor 118 of the power cable assembly connecting the power source 104 to the load 120. An AC voltage source is connected to the pilot conductor 122 and ground return 130. In one example, the voltage source is an AC voltage source. In another example, the voltage source is a DC voltage source.

In one embodiment, the current monitor module 202 includes a current sensor. For example, the current sensor may be a Hall-effect sensor. In another example, the current sensor may be a resistor-type sensor or other component capable of measuring an AC current, a DC component of the current, or both in the pilot conductor 122 or ground return 130. The current monitor module 202 may also include other components, such as op amps, resistors, capacitors, etc. that enable the current monitor module 202 to produce a signal representative of current through the pilot conductor 122 or ground return 130. One of skill in the art will recognize other forms of the current monitor module 202 capable of measuring current in the pilot conductor 122 or ground return 130 where the current can be DC current, AC current or both.

The apparatus 200 includes, in one embodiment, the ground monitor apparatus 102 with a DC detection module 204 that determines a DC current present in the current monitored by the current monitor module 202. In one embodiment where the voltage source is an AC voltage source, the voltage injected by the AC voltage source connected to the pilot conductor 122 and ground return 130 is rectified by the diode in the PWD 124. The diode produces a rectified current waveform in the pilot conductor 122 when the system 100 is working properly. The rectified current waveform has a DC component that is measurable and significant. The DC detection module 204 determines the DC current present in the rectified waveform of the current sensed by the current monitor module 202. If a stray DC current is present in the system 100, the stray DC current may add to the DC current that occurs under typical operating conditions causing the DC current component of the current in the pilot conductor 122 to increase. The DC detection module 204 may detect the DC current component of the typical waveform in addition to any stray DC current that may be present in the pilot conductor 122.

In another embodiment, the loop formed by the pilot conductor 122, the grounding conductor 118, and the ground return 130 does not include a diode. In the embodiment, the DC detection module 204 determines the DC current present in a sinusoidal waveform present in the pilot conductor 122 and ground return 130 and sensed by the current monitor module 202. In the embodiment, under typical operating conditions, current in the pilot conductor 122 or ground return 130 may have a DC current component that is low and when a stray DC current is present in the system 100, the stray DC current may add to sinusoidal current. The DC determination module 204 determines the DC current present in the pilot conductor 122 or ground return 130 may show an increase in measured DC current due to a stray DC voltage in the system 100.

In another embodiment, the DC detection module 204 detects an average DC current in the pilot conductor 122. For example, the DC detection module 204 may detect a DC current present within at least one cycle of the injected AC voltage waveform. If the AC voltage waveform is 60 hertz ("Hz"), the DC detection module 204 may average the sensed DC current over one or more cycles of the AC voltage waveform. By sensing DC current over multiple cycles of the AC voltage waveform, the DC detection module 204 may detect an average DC current that is useful in determining if a stray DC current has been injected into the system 100 and is present in the pilot conductor 122 or ground return 130.

In another embodiment where the voltage source is a DC voltage source, the current monitor module 202 monitors DC current in the pilot conductor 122 or ground return 130 and the DC detection module 204 again determines the DC current in the pilot conductor 122 or ground return 130. The DC detection module 204, in this embodiment, may merely pass on the signal from the current monitor module 202 or may modify the signal prior to action by the DC threshold module 206, such as scaling the signal. The DC detection module 204 may detect DC current present in the pilot conductor 122 or ground return 130 from the DC voltage source along with any stray DC current.

The apparatus 200 includes, in one embodiment, the ground monitor apparatus 102 with a DC threshold module 206 that determines if the DC current in the pilot conductor 122 or ground return 130 is above a DC current threshold. In one embodiment, the DC current threshold corresponds to a current that is above a DC current in the pilot conductor 122 that is at a level indicative of an operating condition without a stray DC current component.

For example, where the voltage source is an AC voltage source, the AC voltage source connected to the pilot conductor 122 may have a root mean square ("RMS") voltage of 15 volts. From the AC voltage source through the pilot conductor 122, through the PWD 124 (when included), through the grounding conductor 118, through the ground return 130 and back to the AC voltage source, the impedance may be known at least within a certain range such that the current within the pilot conductor 122 may be a predictable waveform. Likewise where the voltage source is a DC voltage source, a predictable amount of DC current will be present in the pilot conductor 122 or ground return 130. The DC current of the current within the pilot conductor 122 may then be determined for typical operating conditions. The DC current threshold may then be set to a value that corresponds to a DC current level in the pilot conductor 122 above the DC current level expected under normal operating conditions. Where the voltage source is an AC voltage source and the system 100 does not include the PWD 124 with a diode, a DC current level measured by the current monitor module 202 may be low or zero and the DC current threshold may be set to a different level than where the PWD 124 with a diode is included. Thus when the DC detection module 204 detects a DC current above the DC current threshold, typically a stray DC current is present in the pilot conductor 122.

The apparatus 200 includes, in one embodiment, the ground monitor apparatus 102 with a trip module 208 that opens a contact in response to the DC threshold module 206 determining that the DC current is above the DC current threshold. The contact disconnects the power source 104 from the power cable assembly. In one embodiment, the contact is the relay 108 in the power source 104. By opening the relay 108, the trip module 208 helps to reduce any hazard caused by the stray DC current present in the system 100, such as the ground monitor apparatus 102 being rendered inoperable by the stray DC current. In one embodiment, the DC threshold module 206 sends a signal that causes the relay 108 to open. For example, where the power source 104 includes a fault detection module (not shown) that opens the relay 108, the trip module 208 may send a signal to the fault detection module and the fault detection module may open the relay 108. In another embodiment, the trip module 208 encompasses functionality of the fault detection module and trip module 208 opens the relay 108 directly. In another embodiment, the trip module 208 sends a notification that the DC current is above the DC current threshold. For example, the trip module 208 may send a signal to an operator, to a computer, to a monitoring station, or the like so that personnel using the system 100 may be alerted to the hazard.

In one embodiment, the DC detection module 204 and the DC threshold module 206 include a capability to have multiple DC current thresholds for redundancy. For example, the DC detection module 204 and the DC threshold module 206 may include separate circuits such that if one circuit fails the other circuit may operate and detect a DC current above one of the DC current thresholds.

FIG. 3A is a schematic block diagram illustrating an apparatus 300 that includes an alternate embodiment of the ground monitor apparatus 102. The apparatus 300 includes an embodiment of the ground monitor apparatus 102 with a current monitor module 202 and a trip module 208 that are substantially similar to those described above in relation to the apparatus 200 of FIG. 2. The apparatus 300 also includes a current anomaly module 302 and an anomaly threshold module 304, which are described below.

In one embodiment, the apparatus 300 includes a current anomaly module 302 that determines a current of the current monitored by the current monitor module 202 and an anomaly threshold module 304 that determines if the current determined by the current anomaly module 302 is below a current anomaly threshold. The trip module 208 opens a contact in response to the anomaly threshold module 304 determining that the current determined by the current anomaly module 302 is below the current anomaly threshold. The current anomaly module 302 may include one or more amplifiers, resistors, capacitors, and other components that may help to provide a signal proportional to current in the pilot conductor 122 or ground return 130 and measured by the current monitor module 202. The current anomaly module 302 and the anomaly threshold module 304 may be used to determine if a current anomaly exists, such as if the pilot conductor 122 has a short circuit, if the PWD 124 is failed short, or some other condition that reduces current determined by the current anomaly module 302 to below a current anomaly threshold.

In one embodiment, the current anomaly module 302 determines a peak current of the rectified current typically present in the pilot conductor 122 or ground return 130 when a PWD 124 is included with the load 120. In another embodiment, the current anomaly module 302 determines a peak current in the pilot conductor 122 or ground return 130 based on an RMS current. This embodiment may be used when the system 100 does not include a PWD 124 with a diode, for example. In another embodiment where the voltage source is a DC voltage source, the current anomaly module 302 may determine a DC current in the pilot conductor 122 or ground return 130. In the embodiment, the current may be the same as the DC current determined by the DC detection module 204.

In another embodiment, the current anomaly module 302 may determine an average current in the pilot conductor 122 or ground return 130. In another embodiment, the current anomaly module 302 may determine that a current waveform of the current from the current monitor module 202 is non-sinusoidal during typical operation and may determine that the current waveform of the current from the current monitor module 202 is sinusoidal during atypical operation, such as if the PWD 124 has failed short. In a typical operational scenario, current from the current monitor module 202 may be a rectified sinusoidal waveform, thus having a DC component or average current that is greater than zero. If the PWD 124 is shorted or there is a short in the pilot conductor 122, the ground return 130 or grounding conductor 118 is disconnected, or some other similar condition, the current anomaly module 302 may determine that the current from the current monitor module 202 has become sinusoidal, thus having a DC component or average that is lower than typical operation and may be below the current anomaly threshold.

The current anomaly threshold may be set to a level that is below a current level determined by the current anomaly module 302 under typical operating conditions. For example, the current anomaly threshold may be a set to a level that corresponds to a current in the pilot conductor 122 or ground return 130 corresponding to impedance within the loop formed by the pilot conductor 122 and the grounding conductor 118 that is lower than 50 ohms. In one embodiment, 50 ohms corresponds to a particular requirement of MSHA. As impedance increases within the loop formed by the pilot conductor 122 in the grounding conductor 118, current in the pilot conductor 122 decreases. In one embodiment, the current anomaly threshold is set to level that corresponds to an impedance of 45 ohms. In another embodiment the current anomaly threshold is set to a level that corresponds to an impedance of 48 ohms.

In one embodiment, the current anomaly module 302 and the anomaly threshold module 304 include a capability to have multiple current anomaly thresholds for redundancy. For example, the current anomaly module 302 and the anomaly threshold module 304 may include separate circuits such that if one circuit fails the other circuit may operate and detect a current below one of the current anomaly thresholds. Where the voltage source is a DC voltage source, the current anomaly threshold may be set to a level below a current in the pilot conductor 122 or ground return 130 expected in typical operating conditions.

In another embodiment, the current anomaly module 302 and the anomaly threshold module 304 include a capability to determine that the rectified current typically present in the pilot conductor 122 or ground return 130 is no longer rectified. In one example, when the diode in the PWD 124 fails short or another fault condition causes current in the pilot conductor 122 or ground return 130 to change such that the current is not rectified, the current anomaly module 302 reflects a signal that is indicative of a changing current in the pilot conductor 122 or ground return 130. In this condition, current may be less than a current under typical operating conditions due to the presence of a negative portion of the un-rectified waveform, typically occurring when the diode in the PWD 124 fails or if the pilot conductor 122 is shorted. In an embodiment where the voltage source is a DC voltage source, the current anomaly module 302 may detect a change when the diode in the PWD 124 is shorted or when the pilot conductor 122 is shorted. For example, where the diode in the PWD 124 is a zener diode, the current anomaly module 302 or related module may detect a voltage change indicative of the diode failing short or the pilot conductor 122 being shorted to ground. The anomaly threshold module 304 or related module may determine that a signal from the current anomaly module 302 or other module detecting a voltage change is such that a diode failure or short circuit condition exists and may cause the trip module 208 to open the contacts of the relay 108.

FIG. 3B is a schematic block diagram illustrating an apparatus 301 that includes another embodiment of the ground monitor apparatus 102. The apparatus 301 includes, in various embodiments, a current monitor module 202, a DC detection module 204, a DC threshold module 206, a trip module 208, a current anomaly module 302, and an anomaly threshold module 304, which are substantially similar to those described above in relation to the apparatuses 200, 300 of FIGS. 2 and 3A. The apparatus 301, in various embodiments, also includes a return current module 306, and a return current threshold module 308, which are described below.

The current anomaly module 302 and anomaly threshold module 304, in one embodiment, may work in conjunction with the DC detection module 204 and the DC threshold module 206 to monitor multiple problems within the system 100 while meeting MSHA requirements, such as MSHA testing standard 30 of the Code of Federal Regulations ("C.F.R.") section 75 and 30 C.F.R. section 77.

In one embodiment, the apparatus 301 includes a return current module 306 that determines a current of the current in the grounding conductor 118 and a return current threshold module 308 that determines if the current in the grounding conductor 118 is below a return current threshold. The trip module 208 also opens the contact in response to the return current threshold module 308 determining that the current in the grounding conductor 118 is below the return current threshold. In one embodiment, the return current module 306 receives a current sense signal from the return current sensor 128. For example, the return current sensor 128 may include a current transformer. In other examples, the return current sensor 128 may include a current sensor of the different type. For example the return current sensor 128 may be a Hall-effect sensor. In one embodiment, the return current module 306 determines an average current of the current in the grounding conductor 118 and the return current threshold module 308 determines if the average current in the grounding conductor 118 is below a return current threshold.

In one embodiment where the voltage source is an AC voltage source, the return current module 306 typically determines that the current in the grounding conductor 118 is above a particular level that typically occurs when a half wave current signal is present on the grounding conductor 118 when the system 100 includes a PWD 124 or an RMS current above a particular level when the system 100 does not include a PWD 124 with a diode. In another embodiment where the voltage source is a DC voltage source, the return current module 306 typically determines that the current, which is a DC current, in the grounding conductor 118 is above a particular DC current level that typically occurs when the DC current injected in the pilot conductor 122 is returned in the grounding conductor 118.

Typically there will be a ground path between the chassis ground of the power source 104 and the chassis ground of the load 120. For example the ground path may include a path through the earth. Typically this ground path is higher impedance than the grounding conductor 118. However, when impedance of the grounding conductor 118 rises, for example when a connection is loose or when the grounding conductor 118 is broken, a significant portion of current through the pilot conductor 122 travels through the earth ground path between the two chassis grounds. The return current module 306 and the return current threshold module 308 operate in conjunction with the relay 108 to open the contacts of the relay 108 when a significant portion of current in the pilot conductor 122 returns through the ground path of the chassis grounds.

In one embodiment, the return current threshold is set to correspond to an impedance of much less than 50 ohms which may correspond to a situation when a significant portion of current in the pilot conductor 122 returns through the ground path of the chassis grounds. For example, the return current threshold may be set to be within a range of 50 ohms to 10 ohms. In one embodiment, the return current threshold is set to 16.7 ohms. In another embodiment, the return current threshold is set to 20 ohms. In a particular embodiment the return current module 306 and the return current threshold module 308 include an ability to have multiple thresholds. For example, the return current module 306 and the return current threshold module 308 may include redundant circuits and components with each having a different return current threshold. If one fails, the other may continue to operate. In one embodiment the first return current threshold is set to 16.7 ohms, and a second return current threshold is set to 20 ohms. The impedances of the return current thresholds typically correspond to a decrease in current in the grounding conductor 118. In one embodiment, the return current threshold is set to meet a specific test of the MSHA standards mentioned above. The modules 202-208, 302-308 of the apparatus 301 work together to provide multiple methods of tripping the context of the relay 108 to protect against a variety of grounding problems and to reduce the risk associated with various hazards. In addition, the apparatus 301 allows compliance with current MSHA standards.

Figure 4:
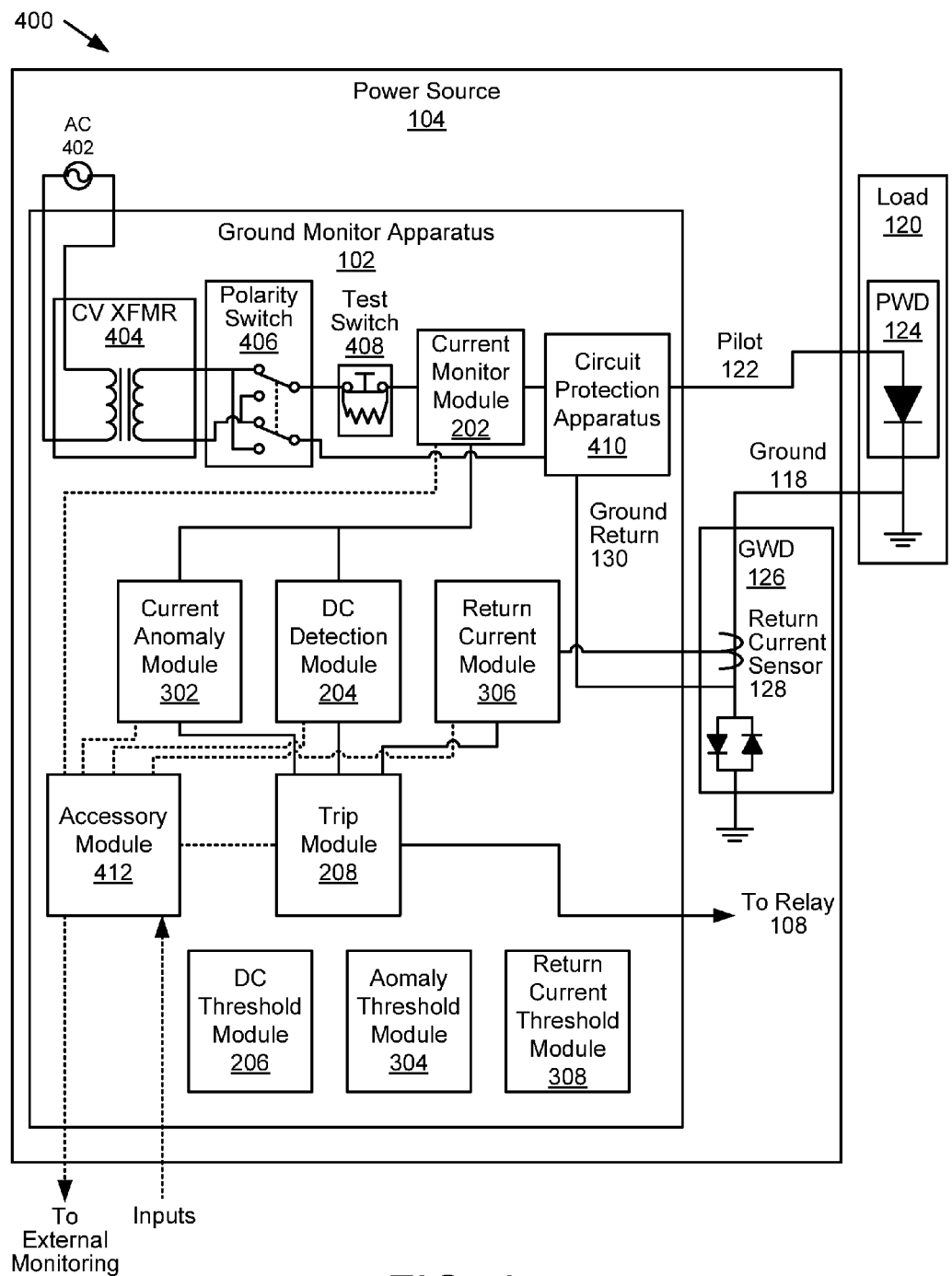
FIG. 4 is a schematic block diagram illustrating an apparatus that includes a more detailed embodiment of a ground monitor apparatus.

FIG. 4 is a schematic block diagram illustrating an apparatus 400 that includes a more detailed embodiment of a ground monitor apparatus 102. The apparatus 400 includes an embodiment of the ground monitor apparatus 102 in the power source 104, a load 120, a PWD 124, GWD 126 with a return current sensor 128, a pilot conductor 122, a grounding conductor 118, a ground return 130, a current monitor module 202, a DC detection module 204, a DC threshold module 206, the trip module 208, a current anomaly module 302, an anomaly threshold module 304, a return current module 306, and a return current threshold module 308, which are substantially similar to those described in relation to the system 100 of FIG. 1 and the apparatuses 200, 300, 301 of FIGS. 2, 3A and 3B. Some elements, such as the power cable assembly and the three-phase power source 106 are not shown in FIG. 4 for clarity, but may be included in a system with the apparatus 400 of FIG. 4. The apparatus 400 also includes an AC voltage source 402 substantially similar to the AC voltage source described above connected to the pilot conductor 122. The apparatus 400 may also include a constant voltage transformer 404, a polarity switch 406, a test switch 408, a circuit protection apparatus 410, and an accessory module 412, which are described below.

In one embodiment, the power source 104 includes an AC voltage source 402 connected to feed the pilot conductor 122. In another embodiment, the AC voltage source 402 is located within the ground monitor apparatus 102. The AC voltage source 402 typically provides an AC voltage waveform and enough power to send a signal through the pilot conductor 122 and back through the grounding conductor 118 and ground return 130. The AC voltage source 402, for example, may be a 120 V source. In another embodiment, the AC voltage source 402 derives power from the power source 104. For example, the AC voltage source 402 may be connected to one or more phases (e.g. 110, 112, 114) of the three-phase power source 106 and/or to a neutral conductor of the three-phase power source 106. In another embodiment, a DC voltage source (not shown) is connected to inject current in the pilot conductor 122. One of skill in the art will recognize other ways to provide an AC voltage source 402 capable of providing a signal through the pilot conductor 122 or ground return 130.

In one embodiment, the ground monitor apparatus 102 includes a constant voltage transformer 404. For example, the constant voltage transformer 404 may provide a constant 15 V output when the AC voltage source 402 is a voltage that varies. In another embodiment, the ground monitor apparatus 102 includes a polarity switch 406. The polarity switch 406 may provide an ability to switch the polarity from the conductors of the output of the constant voltage transformer 404. In some alternate embodiments, the polarity switch 406 may switch the polarity of the input of the constant voltage transformer 404, or conductors of an output of the AC voltage source 402. The polarity switch 406 may provide a convenient way to switch polarity such that the ground monitor apparatus 102 and associated modules 202-208, 302-308 are able to properly sense current in the grounding conductor 118. In another embodiment, the ground monitor apparatus 102 includes a test switch 408 that allows a user to test the ground monitor apparatus 102. For example, the test switch 408 may include a resistor such that when a button is pushed on the test switch 408, the resistor is connected in series with the pilot conductor 122. In another embodiment, the test switch 408 is in series with the ground return 130. The resistor may be sized appropriately to simulate a condition of a high impedance condition in the loop formed by the pilot conductor 122 in the grounding conductor 118.

In one embodiment, the apparatus 400 includes a circuit protection apparatus 410 that helps to lower the risk associated with high voltage transients and short-circuit currents. The circuit protection apparatus 410 will be described in greater detail in relation to the apparatus 410 of FIG. 7.

In one embodiment, the apparatus 400 includes an accessory module 412 with at least one signal connector that includes a plurality of connection points. Each connection point providing access to a signal within the ground monitor apparatus 102. In one embodiment, the accessory module 412 includes a connection point for accessing signals for an output of the circuit that monitors current in the pilot conductor 122 or ground return 130, for example, from the current monitor module 202. In another embodiment, the accessory module 412 includes a connection point for accessing signals for a circuit responding to a current in the pilot conductor 122 or ground return 130 transitioning below an anomaly current threshold, for example from the anomaly threshold module 304. In another embodiment, the accessory module 412 includes a connection point for accessing signals for a circuit responding to a current in the grounding conductor 118 transitioning below a return current threshold, for example from the return current threshold module 308.

In another embodiment, the accessory module 412 includes a connection point for accessing signals for a circuit indicating current status of a circuit to open contacts connecting the power source 104 to the power cable assembly, for example from the trip module 208 and/or relay 108. In another embodiment, the accessory module 412 includes a connection point for accessing one or more signals for a circuit responding to a DC current in the pilot conductor 122 or ground return 130 transitioning above a DC current threshold. In another embodiment, the accessory module 412 includes a connection point for accessing one or more signals for a circuit monitoring current in the grounding conductor 118, for example from the DC threshold module 206.

In one embodiment, the connection points of the accessory module 412 are part of a first part of a connector assembly configured to connect to a second part of the connector assembly. The second part of the connector assembly may be connected to conductors external to the ground monitor apparatus 102. For example, the accessory module 412 may include a standard connector with male or female connection configured to mate to a female or male connector that connects to a wiring harness. Wiring harness may be connected to a computer or other equipment for monitoring various points within the ground monitor apparatus 102. In another embodiment, the accessory module 412 includes active or passive hardware that allows connection to a computer for monitoring various signals within the ground monitor apparatus 102. The accessory module 412 may include various circuit components, such as resistors to properly buffer the connection points from the circuits within the ground monitor apparatus 102.

In one embodiment, the accessory module 412 includes one or more connections that may allow input to the ground monitor apparatus 102. For example, the accessory module 412 may include an input to set a threshold, reference signal, trip point, etc. The accessory module 412 may facilitate diagnosis of problems within the ground monitor apparatus 102 and may include circuits, logic, software, etc. for self-diagnosis or to connect to another device for diagnosis of problems. In another embodiment, the inputs may remotely control the ground monitor apparatus 102. In another embodiment, the accessory module 412 includes contacts related to the trip module 208, such as additional contacts or auxiliary contacts. For example, the accessory module 412 may include normally closed ("NC") or normally open ("NO") contacts of a relay that is part of the trip module 208. In another embodiment, the accessory module 412 may include auxiliary outputs on a latching trip indicator, which may be a circuit breaker protecting the ground monitor apparatus 102.

In another embodiment, the accessory module 412 includes power supply lines. For example, the accessory module 412 may include a connection to monitor power supply status or connection points to input power from an external power supply. In another embodiment, the power supply lines may be outputs from a power supply in the ground monitor apparatus 102 for supplying power to a device external to the ground monitor apparatus 102. In another embodiment, the accessory module 412 includes a wireless communication function that receives and transmits wirelessly to communicate data to and from various connection points within the ground monitor apparatus 102. One of skill in the art will recognize other ways to access signals within the ground monitor apparatus 102 and other useful signals, connections, contacts, etc. to monitor or connect to within the ground monitor apparatus 102.

In another embodiment, the accessory module 412 includes power supply lines. For example, the accessory module 412 may include a connection to monitor power supply status or connection points to input power from an external power supply. In another embodiment, the power supply lines may be outputs from a power supply in the ground monitor apparatus 102 for supplying power to a device external to the ground monitor apparatus 102. In another embodiment, the accessory module 412 includes a wireless communication function that receives and transmits wirelessly to communicate data to and from various connection points within the ground monitor apparatus 102. One of skill in the art will recognize other ways to access signals within the ground monitor apparatus 102 and other useful signals, connections, contacts, etc. to monitor or connect to within the ground monitor apparatus 102.

In one embodiment, the signals of the connection points of the accessory module 412 are in addition from signals to the ground monitor apparatus 102 (i.e. ground monitor) that interface with the power source 104. In another embodiment, the signals of the connection points of the accessory module 412 include separate signals from the ground monitor apparatus 102 (i.e. ground monitor) that interface with the power source 104 in addition to signals indicating status of signals from the ground monitoring apparatus 102 to the power source 104. In another embodiment, the accessory module 412 is sealed with respect to the ground monitor apparatus 102 such that the seal prevents moisture from entering the ground monitor through the accessory module 412 and though an associated opening in a case of the ground monitor apparatus 102 for the accessory module 412. For example, the accessory module 412 may have a water resistant or waterproof seal to the case of the ground monitor apparatus 102. The accessory module 412 may also be water resistant or waterproof to prevent water from entering through the accessory module 412 itself.

Figure 5A:
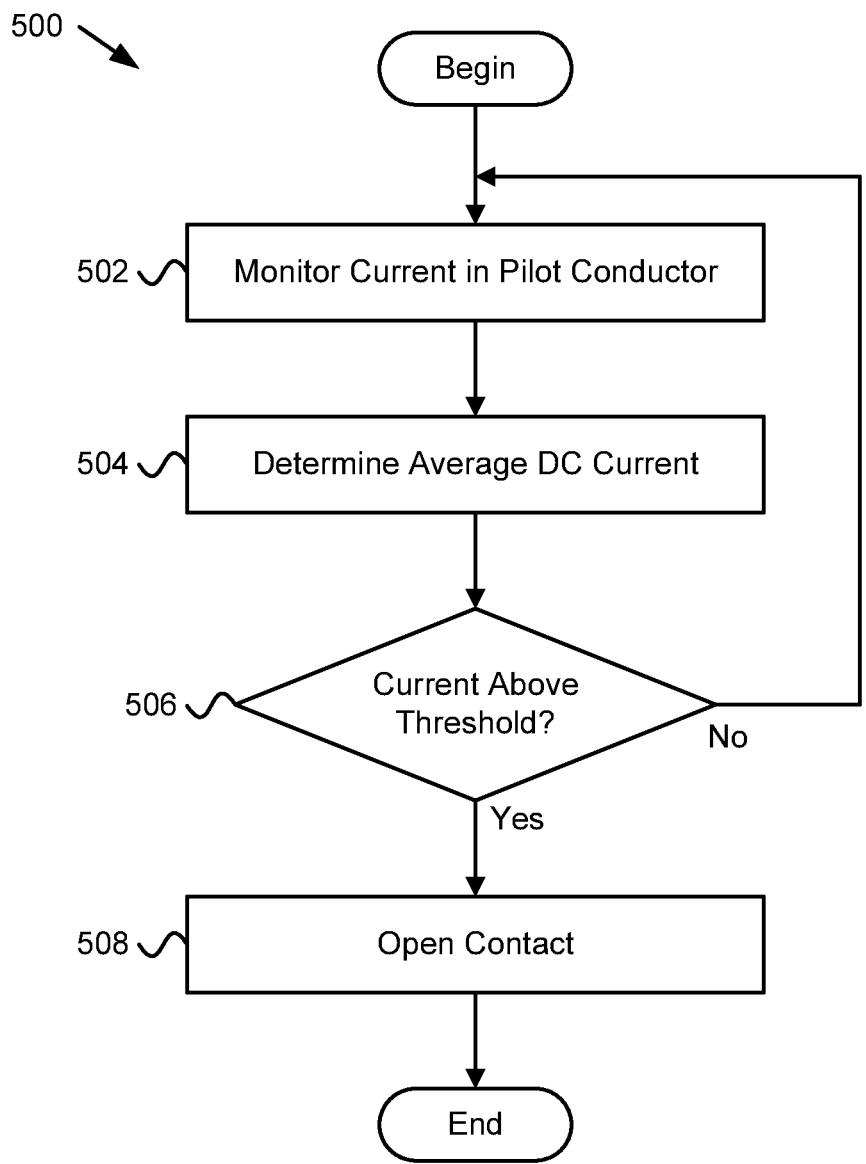
FIG. 5A is a schematic flow chart diagram illustrating one embodiment of a method for monitoring ground current.

FIG. 5A is a schematic flow chart diagram illustrating one embodiment of a method 500 for monitoring ground current. The method 500 begins and monitors 502 current in the pilot conductor 122 or ground return 130 of the ground monitor apparatus 102. The pilot conductor 122 injects current in the grounding conductor 118 of the power cable assembly connecting the power source 104 to the load 120 and a voltage source is connected to the pilot conductor 122 and ground return 130. In one embodiment, the current monitor module 202 monitors 502 current in the pilot conductor 122 or ground return 130.

The method 500 determines 504 DC current present in the pilot conductor 122 or ground return 130. In one embodiment, the DC detection module 204 determines 504 DC current present in the pilot conductor 122 or ground return 130. In one example, the DC detection module 204 determines 504 DC current present in the pilot conductor 122 or ground return 130. The method 500 determines 506 if the DC current is above the DC current threshold. If the method 500 determines 506 that the DC current is below the DC current threshold, the method 500 returns and monitors 502 current in the pilot conductor 122 or ground return 130. If the method 500 determines 506 that the DC current is above the DC current threshold, the method 500 opens 508 a contact that disconnects the power source 104 from the power cable assembly, and the method 500 ends. In one embodiment, the DC threshold module 206 determines 506 if the current in the DC current is above the DC current threshold and the trip module 208 opens the contact. The contact may be part of the relay 108.

Figure 5B:
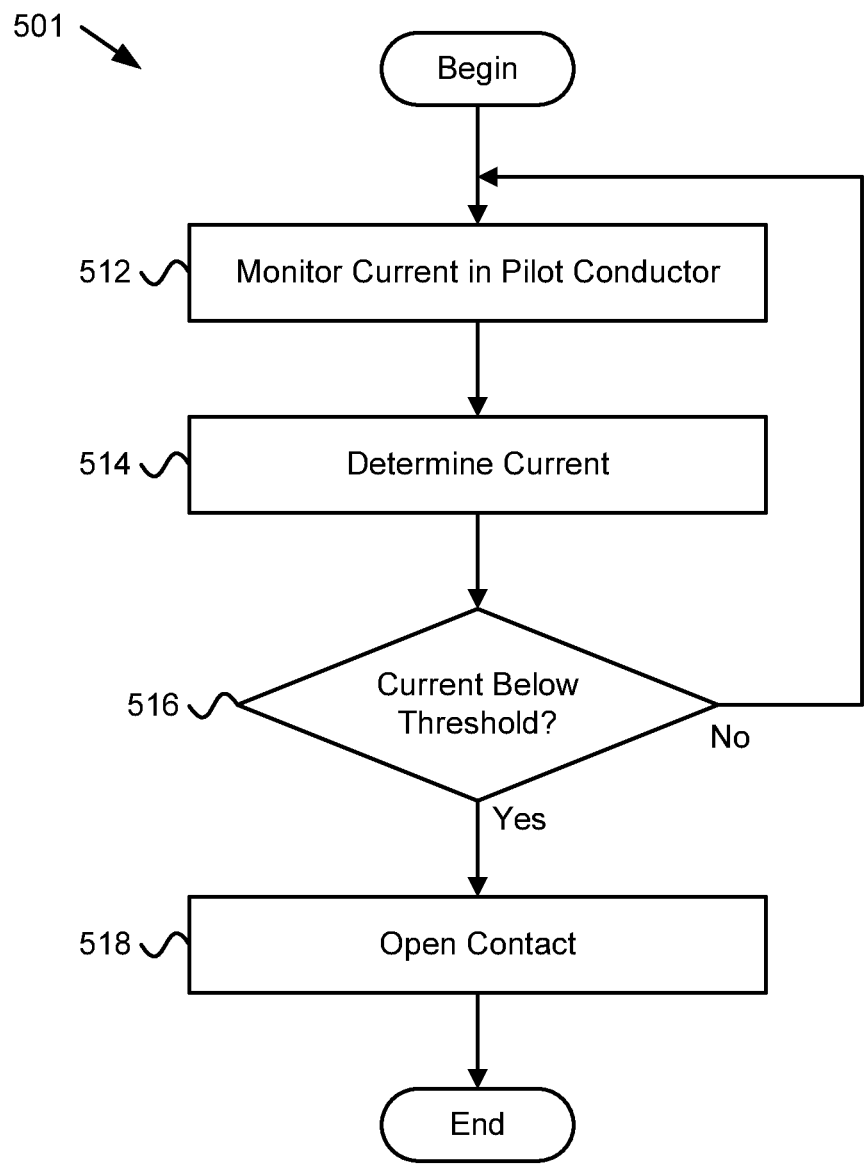
FIG. 5B is a schematic flow chart diagram illustrating another embodiment of a method for monitoring ground current.

FIG. 5B is a schematic flow chart diagram illustrating another embodiment of a method 501 for monitoring ground current. The method 501 begins and monitors 512 current in the pilot conductor 122 or ground return 130 of the ground monitor apparatus 102. The pilot conductor 122 injects current in the grounding conductor 118 of the power cable assembly connecting the power source 104 to the load 120 and a voltage source is connected to the pilot conductor 122 and ground return 130. In one embodiment, the current monitor module 202 monitors 512 current in the pilot conductor 122 or ground return 130. In one embodiment, the current monitor module 202 monitors 512 current using a Hall-effect sensor.

The method 501 determines 514 current of the monitored current. For example, the current anomaly module 302 may determine 514 current of the monitored current. The method 501 determines 516 if the current is below a current anomaly threshold. If the method 501 determines 516 that the current is above a current anomaly threshold, the method 501 returns and monitors 512 current in the pilot conductor 122 or ground return 130. If the method 501 determines 516 that the current is below a current anomaly threshold, the method 501 opens 518 a contact that disconnects the power source 104 from the power cable assembly, and the method 501 ends. In one embodiment, the current anomaly module 302 determines 514 the current and the anomaly threshold module 304 determines 516 if the current is below the current anomaly threshold and the trip module 208 opens the contact. The contact may be part of the relay 108.

Figure 6:
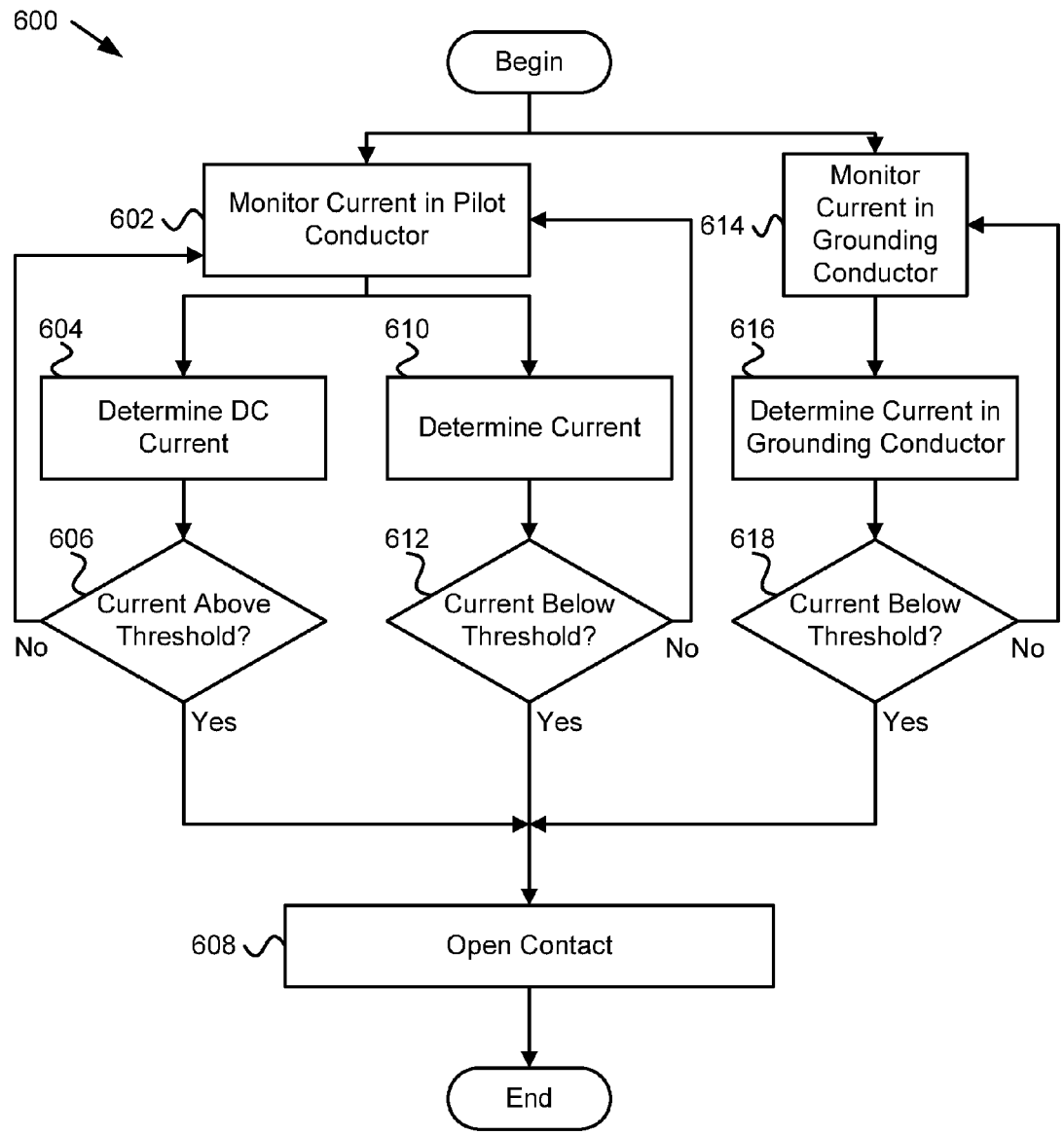
FIG. 6 is a schematic flow chart diagram illustrating another embodiment of a method for monitoring ground current.

FIG. 6 is a schematic flow chart diagram illustrating another embodiment of a method 600 for monitoring ground current. The method 600 begins and monitors 602 current in the pilot conductor 122 or ground return 130 of the ground monitor apparatus 102. The method 600 determines 604 DC current present in the pilot conductor 122 or ground return 130 and determines 606 if the DC current is above the DC current threshold. If the method 600 determines 606 that the DC current is below the DC current threshold, the method 600 returns and monitors 602 current in the pilot conductor 122 or ground return 130. If the method 600 determines 606 that the DC current is above the DC current threshold, the method 600 opens 608 a contact that disconnects the power source 104 from the power cable assembly, and the method 600 ends.

The method 600 also determines 610 current in the pilot conductor 122 or ground return 130 and determines 612 if the current is below an anomaly current threshold. If method 600 determines 612 that the current is below a current anomaly threshold, the method 600 returns and monitors 602 current in the pilot conductor 122 or ground return 130. If method 600 determines 612 that the current is below a current anomaly threshold, the method 600 opens 608 the contact that disconnects the power source 104 from the power cable assembly, and the method 600 ends.

The method 600 also monitors 614 current in the grounding conductor 118 and determines 616 a current of the current in the grounding conductor 118. In one embodiment, the return current module 306 determines 616 the current of the current in the grounding conductor 118. In another embodiment, the return current sensor 128 senses return current in the grounding conductor 118. The method 600 determines 618 if the current in the grounding conductor 118 is below a return current threshold. If the method 600 determines 618 that the current in the grounding conductor 118 is above a return current threshold, the method 600 returns and monitors 614 current in the grounding conductor 118. If the method 600 determines 618 that the current in the grounding conductor 118 is below a return current threshold, the method 600 opens 608 the contact that disconnects the power source 104 from the power cable assembly, and the method 600 ends.

Figure 7:
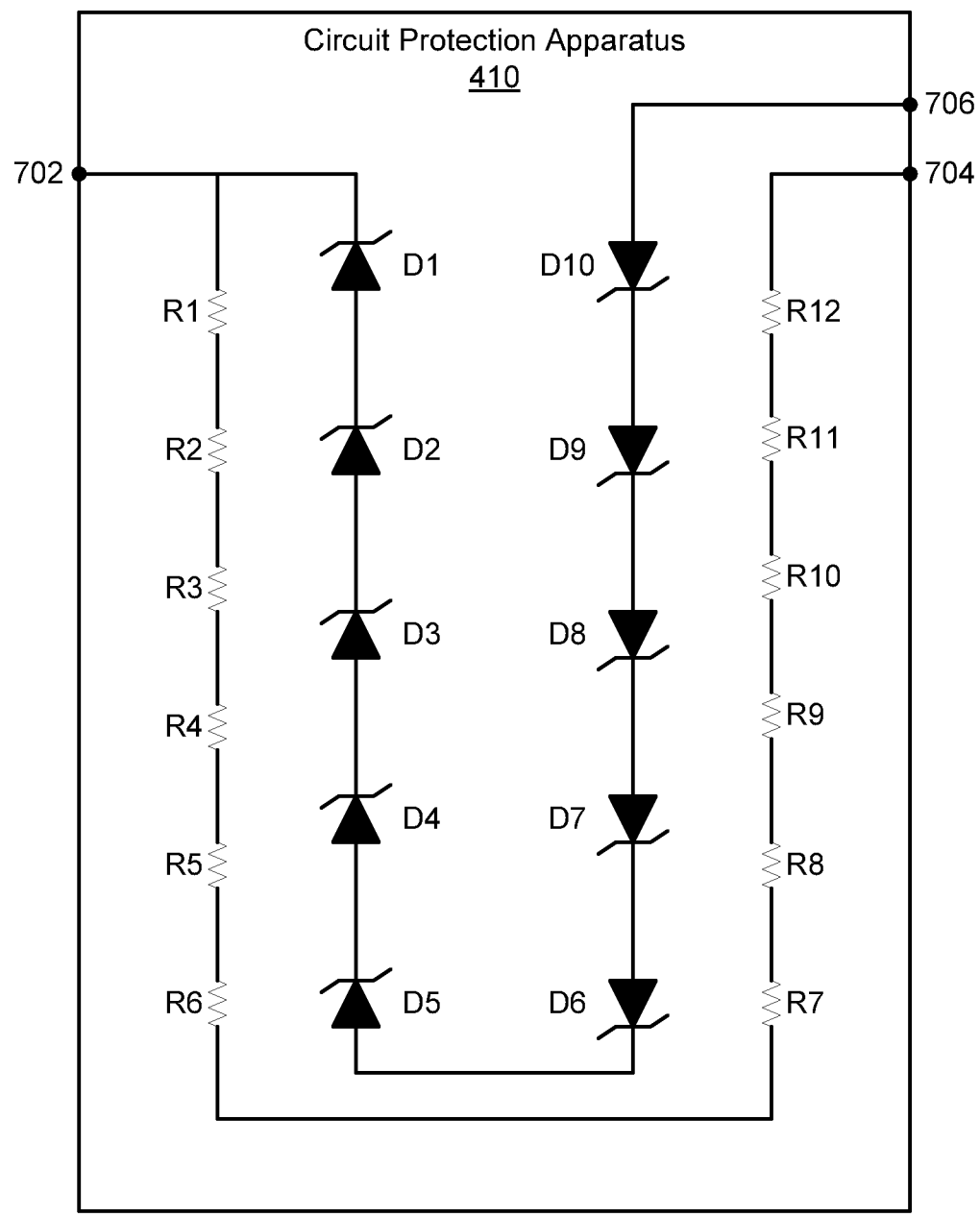
FIG. 7 is a schematic diagram illustrating one embodiment of a circuit protection apparatus.

FIG. 7 is a schematic diagram illustrating one embodiment of a circuit protection apparatus 410. The circuit protection apparatus 410 includes a resistor assembly connected between a first terminal 702 and a second terminal 704. Typically the first and second terminals 702, 704 are connected in the ground monitor apparatus 102 in series with the pilot conductor 122 and the pilot conductor 122 injects a current signal in the grounding conductor 118 of the power cable assembly. The resistor assembly includes a plurality of resistors connected in series between the first terminal 702 and the second terminal 704.

In addition, the circuit protection apparatus 410 includes a zener diode assembly connected between a zener connection point and a terminal 706 that is connected to the ground return 130 of the ground monitor apparatus 102. The zener diode assembly includes a plurality of zener diodes connected between the zener connection point and the terminal 706 that is connected to the ground return 130. The zener connection point, in one embodiment, is the first terminal 702. In another embodiment, the zener connection point is the second terminal 704. The Zener diode assembly is connected in series between the Zener connection point and the terminal 706 connected to the ground return 130. The zener diode assembly is sized to clamp a voltage from the zener connection point to the ground to a value of less than or equal to a zener threshold. The zener threshold voltage is typically set above a nominal AC voltage on the pilot conductor 122.

In one embodiment where the AC voltage on the pilot conductor 122 is 15 V RMS with the peak voltage of around 21 V, for example when the constant voltage transformer 404 is connected to the pilot conductor 122, the zener threshold may be set above a peak voltage of the AC voltage injected on the pilot conductor 122. In another embodiment where the voltage source is a DC voltage source, the zener threshold may be set above a DC voltage of the DC voltage source. In one embodiment the zener threshold may be set to 20 V. In alternate embodiment, the resistor assembly is in series with the ground return 130. In the embodiment, the zener diode assembly remains connected with cathodes of the zener diodes D1-D10 connected to the pilot conductor 122 and anodes connected to the ground return 130.

In one embodiment, the plurality of resistors, the plurality of zener diodes, the first terminal 702 and the second terminal 704 are spaced to prevent an arcing fault current for voltages less than or equal to an expected transient voltage. In one embodiment, the expected transient voltage is a 3000 V. The 3000 V expected transient voltage, in one embodiment, is derived from an MSHA test. For example, the plurality of resistors and the plurality of Zener diodes may be arranged to be spaced physically apart to prevent an arcing fault current for transient voltages less than the expected transient voltage. In addition the terminals 702, 704, 706, of the circuit protection apparatus 410 may also be spaced to prevent an arcing fault current for transient voltages less than the expected transient voltage.

In another embodiment, the circuit protection apparatus 410 includes a heat sink where the heat sink is isolated from the chassis of the ground monitor apparatus 102. In another embodiment, the circuit protection apparatus 410 is isolated from the chassis of the ground monitor apparatus 102 with insulated bushings or other insulation devices. In another embodiment, the circuit protection apparatus 410 is isolated from the chassis and is designed to withstand a 3000 transient voltage during a fault without developing an arcing fault current between components, between components of the circuit protection apparatus 410 and the heat sink, between the circuit protection apparatus 410 and the chassis of the ground monitor apparatus 102, etc.

In one embodiment, a neutral grounding resistor 116 is connected between the neutral connection of the power source 104 and chassis ground of the power source 104. The neutral grounding resistor 116 is typically sized based on available voltages within the power source 104 to limit current through the neutral grounding resistor 116 to about 25 A such that no more than about 100 V is present in the power source 104 during fault conditions. In one embodiment, the resistor assembly includes 12 resistors R1-R12, and each resistor is 1.5 ohms. The total resistance in the resistor assembly this embodiment is 18 ohms. For a ground monitor apparatus 102 meeting MSHA requirements, a neutral grounding resistor ("NGR") in the power source 104 may be sized and arranged such that under typical fault conditions the expected voltage on the pilot conductor 122 is limited to about 100 V.

Typically the resistance of the circuit protection apparatus 410 is the dominant resistance within the loop formed by the pilot conductor 122, grounding conductor 118, and ground return 130. For 100 volts on the pilot conductor 122, the 18 ohms of the resistor assembly would limit current in the pilot conductor 122 or ground return 130 to around 5.6 A. In one embodiment, the resistance in the resistor assembly is sized to allow overcurrent protection for the pilot conductor 122 to open under fault conditions.

The Zener diode assembly also helps to limit voltage transients and other high-voltage conditions. In one embodiment the Zener diode assembly includes 10 Zener diodes arranged in series between the Zener connection point and the terminal 706 that connects to the ground return 130. In the embodiment, the Zener voltage for each Zener diode D1-D10 is 4.3 V so that the total Zener voltage for the Zener diode assembly is about 20 V. For transient voltages, the peak transient voltage may be spread across the Zener diodes D1-D10 of the Zener diode assembly. Having multiple Zener diodes may help to spread the transient voltage across the Zener diodes so that each diode is not required to be able to withstand the full transient voltage. Where ten Zener diodes D1-D10 are used, typically each Zener diode would see one tenth of the total transient voltage. In addition, where multiple resistors are used in the resistor assembly, the total transient voltage may be spread across the resistors R1-R12 of the resistor assembly. In the case where 12 resistors R1-R12 are used, typically the voltage across any resistor in the resistor assembly is about one twelfth of the total transient voltage.

In one embodiment, the resistor assembly is rated to between about 10 ohms and 30 ohms. In another embodiment, each resistor (e.g. R1) is a 50 W resistor so that the resistor assembly is rated to 600 watts. In one embodiment the resistors R1-R12 of the resistor assembly are rated to withstand both transient voltage conditions and fault conditions for expected transient voltages and fault currents. In one embodiment, the resistor assembly and the zener diode assembly are mounted on a substrate electrically isolated from other components to prevent arcing from the resistor assembly and/or the zener diode assembly during a transient voltage of 3000 V or less. The circuit protection apparatus 410 advantageously limits fault current and transient voltages while allowing overcurrent protection to open during fault conditions. The circuit protection apparatus 410 devices in that the circuit protection apparatus 410 allows the ground monitor apparatus 102 to meet MSHA tests.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ground monitor apparatus comprising:
    a current monitor module that monitors current in one of a pilot conductor and a ground return, the pilot conductor injecting current in a grounding conductor of a power cable assembly connecting a power source to a load, wherein a voltage source is connected to the pilot conductor and the ground return;
    a DC detection module that determines a direct current ("DC") current present in the current monitored by the current monitor module;
    a DC threshold module that determines if the DC current is above a DC current threshold; and
    a trip module that opens a contact in response to the DC threshold module determining that the DC current is above the DC current threshold, the contact disconnecting the power source from the power cable assembly.

2. The apparatus of claim 1, further comprising:
    a current anomaly module that determines a current of the current monitored by the current monitor module; and
    an anomaly threshold module that determines if the current determined by the current anomaly module is below a current anomaly threshold,
    wherein the trip module further opens the contact in response to the anomaly threshold module determining that the current determined by the current anomaly module is below the anomaly current threshold.

3. The apparatus of claim 2, wherein the anomaly current threshold corresponds to a grounding conductor resistance of less than 50 ohms.

4. The apparatus of claim 2, wherein the current anomaly module determines a current of the current monitor module by one or more of
    determining a DC current of the current monitored by the current monitor module;
    determining an average current of the current monitored by the current monitor module; and
    determining a peak current of the current monitored by the current monitor module.

5. The apparatus of claim 1, wherein the current monitor module comprises a Hall-effect current sensor.

6. The apparatus of claim 1, wherein the DC current threshold corresponds to a current that is above a DC current in the pilot conductor or ground return that is at a level indicative of an operating condition without a stray DC current component.

7. The apparatus of claim 1, further comprising:
    a return current sensor that monitors current in the grounding conductor;
    a return current module that determines a current in the grounding conductor;
    a return current threshold module that determines if the current in the grounding conductor is below a return current threshold; and
    wherein the trip module further opens the contact in response to the return current threshold module determining that the current in the grounding conductor is below the return current threshold.

8. The apparatus of claim 1, wherein the voltage source comprises an alternating current ("AC") voltage source and further comprising a diode located at the load and connected between a pilot conductor from the current monitor module and the grounding conductor, wherein the diode rectifies the voltage of the AC voltage source.

9. The apparatus of claim 1, wherein the apparatus comprises a ground monitor in a power supply for a mine.

10. The apparatus of claim 1, wherein the apparatus complies with mine safety and health administration ("MSHA") testing standard 30 the Code of Federal Regulations ("C.F.R.") section 75, 30 C.F.R. section 77, American Society for Testing and Materials ("ASTP") standard 2135, and MSHA document number ACRI 2003.

11. A ground monitor apparatus comprising:
    a current monitor module that monitors current with a Hall-effect sensor, the current monitor module monitoring current in one of a pilot conductor and a ground return, the pilot conductor injecting current in a grounding conductor of a power cable assembly connecting a power source to a load, wherein a voltage source is connected to the pilot conductor and the ground return;

a current anomaly module that determines a direct current ("DC") current of the current monitored by the current monitor module;

an anomaly threshold module that determines if the current determined by the current anomaly module is below a current anomaly threshold, wherein the anomaly threshold comprises a fixed reference signal; and a trip module that opens a contact in response to the anomaly threshold module determining that the current determined by the current anomaly module is below the current anomaly threshold, the contact disconnecting the power source from the power cable assembly.

12. The apparatus of claim 11, wherein the current anomaly threshold corresponds to a grounding conductor resistance of less than 50 ohms.

13. The apparatus of claim 11, further comprising:

a DC detection module that determines a direct current ("DC") current present in the current monitored by the current monitor module; and a DC threshold module that determines if the DC current is above a DC current threshold, wherein the trip module further opens the contact in response to the DC threshold module determining that the DC current is above the DC current threshold.

14. The apparatus of claim 13, wherein the DC current threshold corresponds to a current that is above a DC current in the pilot conductor or ground return that is at a level indicative of an operating condition without a stray DC current component.

15. The apparatus of claim 11, further comprising:

a return current sensor that monitors current in the grounding conductor;

a return current module that determines a current of the current in the grounding conductor; and a return current threshold module that determines if the current in the grounding conductor is below a return current threshold, wherein the trip module further opens the contact in response to the return current threshold module determining that the current in the grounding conductor is below the return current threshold.

16. The apparatus of claim 11, wherein the voltage source comprises an alternating current ("AC") voltage source and further comprising a diode located at the load and connected between a pilot conductor from the current monitor module and the grounding conductor, wherein the diode rectifies the voltage of the AC voltage source.

17. The apparatus of claim 11, wherein the apparatus complies with mine safety and health administration ("MSHA") testing standard 30 the Code of Federal Regulations ("C.F.R.") section 75, 30 C.F.R. section 77, American Society for Testing and Materials ("ASTP") standard 2135, and MSHA document number ACRI 2003.

18. A system comprising:

a power source;

a current monitor module that monitors current in one of a pilot conductor and a ground return, the pilot conductor injecting current in a grounding conductor of a power cable assembly connecting the power source to a load, a voltage source connected to the pilot conductor and the ground return;

a DC detection module that determines a direct current ("DC") current present in the current monitored by the current monitor module;

a DC threshold module that determines if the DC current is above a DC current threshold; and a trip module that opens a contact in response to the DC threshold module determining that the DC current is above the DC current threshold, the contact disconnecting the power source from the power cable assembly.

19. The system of claim 18, further comprising the power cable assembly.

20. The system of claim 18, further comprising the load.

21. A method comprising:

monitoring current in one of a pilot conductor and a ground return, the pilot conductor injecting current in a grounding conductor of a power cable assembly connecting a power source to a load, wherein a voltage source is connected to the pilot conductor and the ground return;

determining a direct current ("DC") current present in the monitored current;

determining if the DC current is above a DC current threshold; and opening a contact in response to determining that the DC current is above the DC current threshold, the contact disconnecting the power source from the power cable assembly.

22. A method comprising:

monitoring current, with a Hall-effect sensor, in one of a pilot conductor and a ground return, the pilot conductor injecting current in a grounding conductor of a power cable assembly connecting a power source to a load, wherein a voltage source is connected to the pilot conductor and the ground return;

determining a direct current ("DC") current of the monitored current;

determining if the current is below a current anomaly threshold, wherein the anomaly threshold comprises a fixed reference signal; and opening a contact in response to determining that the current is below the current anomaly threshold, the contact disconnecting the power source from the power cable assembly.

* * * * *